Aug. 15, 1961   J. M. HUNT   2,996,251
COMPUTER
Filed Oct. 12, 1955

JOHN M. HUNT
INVENTOR

BY Richard G. Stephens
ATTORNEY

United States Patent Office

2,996,251
Patented Aug. 15, 1961

2,996,251
COMPUTER
John M. Hunt, Binghamton, N.Y., assignor to General Precision Inc., a corporation of Delaware
Filed Oct. 12, 1955, Ser. No. 540,070
2 Claims. (Cl. 235—192)

My invention relates to improved method and means for deriving an output quantity commensurate with the resultant magnitude of two mutually perpendicular coplanar vectors, and more specifically to improved method and means for deriving range potentials or shaft positions for use in navigation equipment, fire control apparatus, and grounded aircraft training apparatus. In a number of well-known analog computer applications, it is necessary or desirable to activate a servo shaft to represent range in a system employing cylindrical coordinates for computation. Cylindrical coordinates represent a vector in three dimensions through the use of planar polar coordinates and a third coordinate perpendicular to the plane of the polar coordinates. A typical example is the representation of the position of an aircraft with respect to a ground radar station in terms of ground bearing angle, ground range, and aircraft altitude.

It is also well-known in the analog computer arts that the position of an aircraft with respect to a ground station may be specified and computed in terms of spherical coordinates, but that the use of spherical coordinates is undesirable if polar or Cartesian coordinates may be used, since the use of spherical coordinates requires a considerably greater amount of computer equipment, giving rise to increased cost and complexity, and decreased accuracy and reliability. In some computer applications it is considered to be quite acceptable to compute the position of the aircraft with respect to the station in cylindrical coordinates, since incorporation of the third variable (altitude) does not complicate computation of ground range or ground bearing angle. However, in computer systems requiring as outputs both slant range and elevation angle of the line-of-sight between aircraft and ground station, it is necessary to perform a rectangular-to-polar coordinate transformation, employing altitude and ground range as the two coordinates. As is well-known in the analog computer art, provision of computer equipment to make the transformation is rather costly. In certain computer applications the elevation angle is of no concern, but it is necessary that slant range be computed with accuracy. The invention provides method and means for providing a slant range output with high accuracy without the complexity and resulting expense attending conversion through spherical coordinates and costly provision of an unwanted output, elevation angle.

It is therefore a primary object of my invention to provide improved method and apparatus for determining the magnitude of the resultant of a pair of mutually perpendicular vectors without utilizing angular quantities relating to said vectors.

It is a further object of my invention to provide improved method and apparatus for providing an output quantity commensurate in magnitude with the range between two points or objects from input data representing the distance between said objects in a plane passing through one of said objects and the distance measured perpendicularly from said plane to the second of said objects.

It is an additional object of the invention to provide improved method and apparatus for providing an output quantity commensurate with slant range from input data representing ground range and altitude.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawing, in which.

Figure 1:
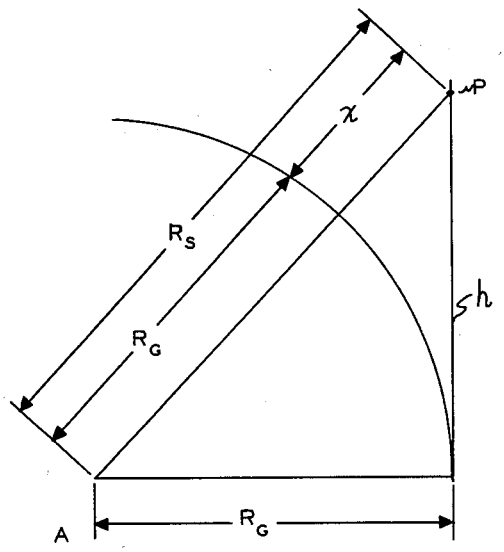
FIG. 1 is a geometrical diagram illustrating in vector form quantities involved in the invention.

Referring to FIG. 1 there are illustrated geometrically the quantities involved in the problem. Assume that an aircraft is located at point P at an altitude $h$ above the ground. The ground range of the aircraft from point A is shown by the horizontal dimension $R_g$. The slant range between the aircraft at P and the grounded object at A is seen to be the hypotenuse of the triangle and equal to $R_S$. If an arc having a radius equal to $R_G$ is swung upwardly to intersect the hypotenuse of the triangle, it will be seen that the slant range $R_S$ may be defined as the sum of the ground range and a quantity $x$ representing the difference between ground range and slant range; or expressed mathematically:

$$R_S = R_G + x \qquad (1)$$

It will be seen that as point P moves with respect to grounded point A, the quantity $x$ will always be a finite number unless altitude decreases to zero, and when point P is located directly over point A (ground range $R_G=0$) the quantity $x$ will comprise the entire slant range quantity. In some prior art computing systems utilizing elevation angle to determine slant range, as point P passed over point A or moved about point A the elevation angle changed sign suddenly, sometimes causing computer servos and other circuits to operate wildly. In the invention no rapid changes of sign nor any discontinuities occur under similar circumstances.

By the Pythagorean theorem:

$$(R_G+x)^2 = R_G^2 + h^2 \qquad (2)$$

$$R_G^2 + 2R_G x + x^2 = R_G^2 + h^2 \qquad (3)$$

Subtracting $R_G^2$ from both sides of Expression 3 and factoring $x$:

$$x(x+2R_G) = h^2 \qquad (4)$$

$$x = \frac{h^2}{x+2R_G} = \frac{h^2}{(x+R_G)+R_G} \qquad (5)$$

$$x = \frac{h^2}{R_s+R_G} \qquad (6)$$

$$\frac{h^2}{R_s+R_G} + R_G = R_s \qquad (6a)$$

Hence it will be seen that by determining the difference between ground range and slant range and by combining a quantity equal to such difference with the ground range input quantity, a slant range output may be provided without utilizing elevation angle information.

Figure 2:
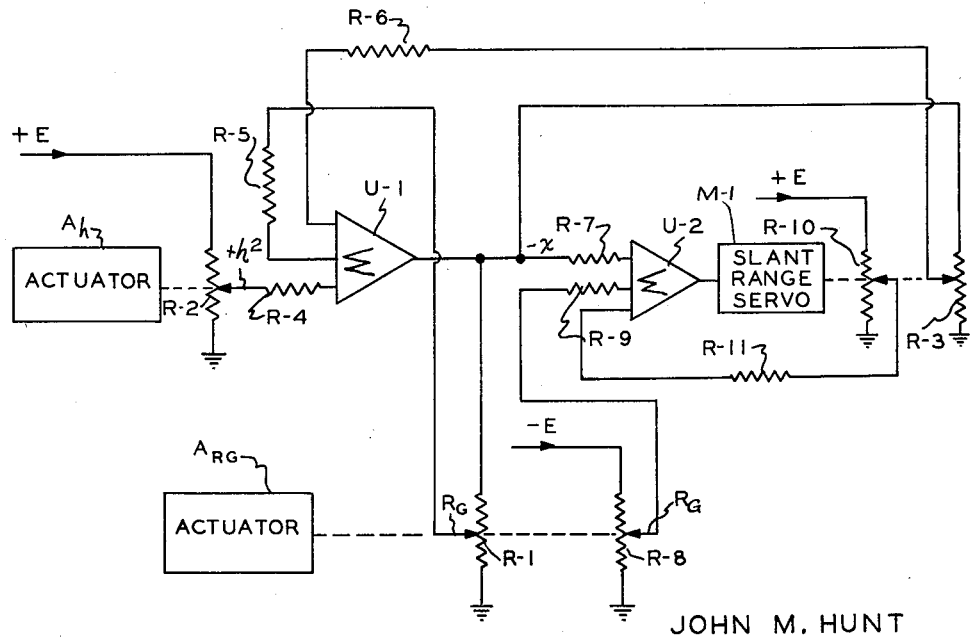
FIG. 2 is an electrical schematic diagram of an exemplary embodiment of the invention, with certain well known parts shown in block form for sake of clarity.

Shown in FIG. 2 in schematic form is an illustrative embodiment of the invention utilizing conventional electrical analogue computer elements connected in accordance with the invention. The input data representing altitude is applied in the form of potential via summing resistance R-4 to the input circuit of a conventional analog computer operational amplifier U-1. This potential which is proportional to $h^2$ is shown as being derived by a square function potentiometer R–2 which has its wiper arm positioned by a mechanical input from an altitude-responsive actuator $A_h$. If desired, square function potentiometer R–2 could be replaced by two linear potentiometers cascaded to give a squared output, as is well-known in the art. The precise form of altitude actuator $A_h$ depends, of course, on the nature of the equipment utilized to provide the input data. In problems related to actual navigation and gunnery, altitude actuator $A_h$ might comprise an altimeter, for example, or an altitude shaft of radio locating or tracking apparatus. In using the invention in conjunction with grounded aircraft training equipment, altitude actuator $A_h$ might comprise the conventional altitude servo of the grounded training equipment, which servo provides a mechanical output commensurate with the "simulated altitude" of the grounded trainer. Furthermore, while I have shown the "altitude squared" input as being derived electro-mechanically, it will be recognized that in many uses of the invention the $h^2$ input may be available as a voltage, and may be applied directly to summing resistance R–4.

The input voltage existing at the junction of summing resistors R–4, R–5 and R–6 is amplified by operational amplifier U–1, and the output of the amplifier is applied to excite potentiometers R–1 and R–3. The potentials appearing on the wiper arms of potentiometers R–1 and R–3 are applied to the input circuit of amplifier U–1 through summing resistors R–5 and R–6, respectively. Amplifier U–1 has a high open-loop voltage gain (of the order of 50,000), so that any potential existing at the junction point of the summing resistors tends to be amplified greatly. However, the polarity of phase inversion in amplifier U–1 causes strong negative feedback potentials to be applied through resistors R–5 and R–6, so that the amplifier U–1 input terminal remains very nearly at ground potential. Assuming such terminal to lie at ground potential, it will be seen that the currents applied through summing resistances R–4 and R–5 and R–6 must add up to zero, or:

$$\frac{E_h^2}{R_4} - \frac{E_{R-5}}{R_5} - \frac{E_{R-6}}{R_6} = 0 \qquad (7)$$

where $E_h^2$=the altitude squared potential applied to resistance R–4
$E_{R-5}$=the potential on the arm of potentiometer R–1
$E_{R-6}$=the potential on the arm of potentiometer R–3
$R_4$, $R_5$, and $R_6$ represent the resistances of resistors R–4, R–5 and R–6.

The $E_{R-5}$ potential will be seen to be equal to the output $E_0$ of amplifier U–1 modified or multiplied in accordance with the wiper arm position of potentiometer R–1, which position is determined by the ground range input data supplied to the computer by ground range actuator $A_{RG}$. Like altitude actuator $A_h$, the precise nature of ground range actuator $A_{RG}$ will be determined by the equipment with which the invention is utilized, and actuator $A_{RG}$ may be assumed to be a servo or other shaft input proportional to ground range $R_G$. The $E_{R-6}$ potential will be seen to be equal to the output $E_0$ of amplifier U–1 modified or multiplied in accordance with the wiper arm position of potentiometer R–3, which position is determined by the position of slant range servo M–1.

Substituting for $E_{R-5}$ and $E_{R-6}$ in Equation 7:

$$\frac{E_h^2}{R_4} - \frac{E_0 R_G}{R_5} - \frac{E_0 R_s}{R_6} = 0$$

Transposing:

$$\frac{E_h^2}{R_4} = \frac{E_0(R_G R_6 + R_s R_5)}{R_5 R_6}$$

$$E_0 = \frac{E_h^2 R_5 R_6}{R_4(R_G R_6 + R_s R_5)} \qquad (8)$$

Dropping the $R_4$, $R_5$ and $R_6$ terms from Expression 8 because resistances R–4, R–5 and R–6 are fixed in value and merely represent constants, it will be seen that the output $E_0$ amplifier U–1 may be expressed as follows:

$$E_0 \approx \frac{E_h^2}{R_G + R_s} \approx x \qquad (9)$$

Comparison of Expression 9 with Expression 6 indicates that the output of amplifier U–1 is proportional to the quantity $x$, the difference between ground range and slant range. It may be noted that even though the circuit of amplifier U–1 performs a division operation, that the denominator of Expression 9 never becomes zero unless point P of FIG. 1 coincides with point A, so that amplifier U–1 is never driven near an infinite output condition. The $x$ potential is applied via summing resistance R–7 to the input circuit of a conventional servo amplifier U–2. The winding of potentiometer R–8 is excited by a constant potential from the computer power supply, and the arm of potentiometer R–8 is positioned in accordance with ground range by actuator $A_{RG}$, so that a potential proportional to ground range is derived for application to the input circuit of summing amplifier U–2 via summing resistor R–9. A follow-up potential from potentiometer R–10 is applied to the input circuit of amplifier U–2 via summing resistance R–11. The output potential from amplifier U–2 is applied to drive slant range servo M–1, and it will be recognized that servo M–1 will rotate until the sum of the input voltages to amplifier U–2 becomes zero, or in other words, until the positive follow-up voltage $R_s$ applied through resistor R–11 exactly cancels the two negative voltages ($x$ and $R_G$) applied through resistors R–7 and R–9, respectively. Hence the servo will seek a position commensurate with slant range $R_s$. The servo shaft positions the arms of potentiometers R–3 and R–10 as mentioned above, and a dial (not shown) or other indicator, or additional voltage deriving potentiometers (not shown) may be operated by the shaft of slant range servo M–1 (through suitable gearing if necessary) to provide the slant range output quantity in the form desired. Servo M–1 may be equipped with a tachometer generator (not shown)) or other rate feedback means to stabilize its operation, and it may also be equipped with mechanical limit stops or switches and other refinements well known in the art. It will be apparent to those skilled in the art that either direct current or alternating current electrical analog computation may be used in practicing the invention, and that mechanical, hydraulic and pneumatic equivalent computing elements may be substituted without departing from the invention. Furthermore, while I have illustrated the invention as applied to a particular problem (slant range), it is particularly to be noted that the invention may be used for computing in the horizontal plane as well as the vertical plane, and that the vector quantities shown may represent accelerations or velocities instead of distances.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. Computer apparatus for providing a mechanical output quantity commensurate with the resultant of a pair of mutually perpendicular co-planar vector quantities, comprising, in combination, means for deriving a first potential commensurate in magnitude with the square of the magnitude of a first of said vector quantities, means for applying said first potential to the input circuit of an operational amplifier, first potentiometer means to modify the output potential of said amplifier in accordance with the magnitude of the second of said vector quantities to produce a second potential, a potentiometer connected to said amplifier to modify said amplifier output potential to provide a third potential, circuit means applying said second and third potentials to the input circuit of said amplifier, second potentiometer means for deriving a fourth potential in accordance with the magnitude of the second of said vector quantities, and servo means responsive to the sum of said amplifier output potential and said fourth potential, the output of said servo means being connected to operate said potentiometer.

2. Computer apparatus for providing a mechanical shaft position output quantity commensurate with the slant distance between two points from input data commensurate with the horizontal distance and altitude between said points, comprising in combination; means for deriving a first potential commensurate with the square of the altitude between said points; an operational amplifier; a first potentiometer connected to be excited by the output potential of said amplifier and positioned in accordance with said horizontal distance for providing a second potential; means for deriving a third potential commensurate with said horizontal distance; a position servomechanism operated by said output potential and said third potential to provide said output mechanical shaft position quantity; a second potentiometer connected to be excited by said output potential of said amplifier and positioned by said servomechanism in accordance with said mechanical shaft position output quantity for providing a fourth potential; and summing circuit means for applying said first, second and fourth potentials to said operational amplifier.

References Cited in the file of this patent

"Electronic Instruments" (Greenwood, Holdam and MacRae), published by McGraw-Hill Book Co. (New York), 1948, pages 140 and 141 relied on.